United States Patent Office 3,073,822
Patented Jan. 15, 1963

3,073,822
PROCESS OF PREPARING 4-SUBSTITUTED-2-MORPHOLONES
Herman S. Schultz and Joseph P. Copes, Easton, Pa., and Raymond L. Mayhew, Phillipsburg, N.J., assignors to General Aniline & Film Corporation, New York, N.Y., a corporation of Delaware
No Drawing. Filed May 10, 1960, Ser. No. 28,017
7 Claims. (Cl. 260—247.7)

This invention relates to an improved method of preparing 4-substituted-2-morpholones. More particularly it relates to a novel process for dehydrogenation of N-substituted-dialkanolamines to 4-substituted-2-morpholones.

It is well known that various species of 4-substituted-2-morpholones can be prepared by several complicated and time consuming laboratory procedures. Such procedures involve, for example, the reaction between N-substituted-2-amino ethanol and sodium chloro acetate by heating in water, followed by distillation. Other N-substituted 2-amino ethanols may also be used in the preparation of 4-substituted-2-morpholones. 2-chloroethanol may also be reacted with N-substituted-2-amino acetic acid and sodium salt to form N-substituted morpholones, for example, N-phenyl-2-amino acetic acid sodium salt when heated with 2-chloroethanol yields 4-phenyl-2-morpholone. The latter compound has been prepared while utilizing the ethyl ester of bromo acetic acid and N-phenyl-2-amino ethanol. The reaction of N-ethyl alanine with ethylene oxide gives 3-methyl-4-ethyl-2-morpholone and with 2,2-dimethyl oxirane gives 3,6,6-trimethyl-4-ethyl-2-morpholone.

In view of the inherently involved procedures leading to difficultly purifiable components in low yields, it is not surprising that the manufacture of 4-substituted-2-morpholones has not been attractive to chemical manufacturers but have remained as items in the technical literature.

We have discovered a superior, efficient and inexpensive process of producing 4-substituted-2-morpholones by the dehydrogenation of N-substituted dialkanolamines by means of a copper catalyst and in the presence of excess hydrogen. We have further discovered that the use of hydrogen gives far better results than the same procedure in the absence of hydrogen or in the presence of an inert diluent gas such as nitrogen. The unexpected feature of our process is that the hydrogen actually enters intimately into the catalytic process. The other new and unexpected feature of our process is that it does not involve the use of expensive and difficult-to-prepare intermediates. Moreover, our process is very efficient and results in the production of 4-substituted-2-morpholones without any significant amount of by-products which are of comparatively low commercial value.

While we prefer to employ a catalyst made of copper on pumice and in the presence of excess hydrogen, the dehydrogenation reaction can also be conducted in the vapor phase over other catalysts which are normally used in the art to promote dehydrogenation. The latter are well known and include metals and combination of metals such as nickel, platinum, palladium, iron, copper, etc., with such additional metals as may be required or desired for activation i.e., chromium and the like. Similarly, these may be in such form as may be required for convenience and utility such as for example powder, tablets, wire, gauze, lumps and/or deposited on such carriers as are normally available in the catalytic industry.

We have further found that the presence of the added hydrogen is necessary to prolong the life of the catalyst. The exact manner in which the added hydrogen functions to prolong the life of the catalyst is not understood but the activity of the catalyst decreases rapidly when an inert carrier gas is used or when no carrier gas is used. The catalyst life seems indefinitely long when hydrogen is added. This is quite surprising since one would expect, in a dehydrogenation reaction, that there should be less rather than more hydrogen present for efficient results. The amount of hydrogen added was usually in the ratio of about 10 to 20 moles or more of hydrogen to about 1 to 2 moles of N-methyl diethanolamine, all per hours per 2 liters of catalyst. More or less hydrogen may be used with beneficial results being somewhat in proportion, but also depending upon other reaction circumstances. This results in a residence time over the catalyst in the order of 5 to 10 seconds and this will vary considerably depending upon many process variables. The reaction must be conducted at a temperature at which the reactants and products are in the vapor phase. There are some indications that grossly elevated temperatures may lead to side reaction products which may not be desirable. A temperature of 270° C. has been quite successful and temperatures between 250° and 300° or even higher are quite practical. Substantially, atmospheric to 100 p.s.i. have been found quite practical pressures for the reaction, the pressure being varied more to regulate the residence time than to influence the course of the reaction.

The reaction may be conducted in a wide variety of equipment, the essentials being provision for vaporizing the substituted dialkanolamine, passing the vapors over the heated catalyst, adding the extra hydrogen preferably pre-heated, condensing and collecting the product. The hydrogen may act as a carrier gas besides preserving the catalyst. In this connection, it should be appreciated that the various 4-substituted-2-morpholones may require variations in conditions so that the hydrogen:N-alkyl diethanolamine ratio could be as high as 100:1 or higher, the temperature as high as 350–400° C., and the residence time ranging from 1 second to 20 seconds.

In substance, our process involves the catalytic vapor phase dehydrogenation of N-alkyl, N-alicyclic, N-aralkyl, and N-aryldialkanolamines. These may also be further substituted as indicated by the formula below. All species of the latter can be readily dehydrogenated in accordance with our process since they can be vaporized within the permissible operating range.

The 4-substituted-2-morpholones prepared in accordance with the present invention are characterized by the following general formula:

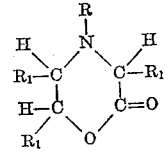

wherein R represents an alkyl of 1 to 10 carbon atoms, alicyclic of 5 or 6 carbon atoms, aryl such as phenyl, or aralkyl such as benzyl, and $R_1$ represents either a lower alkyl or hydrogen.

The N-substituted dialkanolamines utilized in the dehydrogenation procedure are characterized by the following general formula:

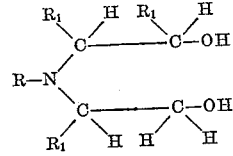

wherein R and $R_1$ have the same values as above. As examples of N-substituted dialkanolamines characterized by the foregoing general formula and utilized for the dehydrogenation procedure of the present invention, the following are illustrative:

N-methyl-diethanolamine
N-ethyl-diethanolamine
N-propyl-diethanolamine
N-isopropyl-diethanolamine
N-butyl-diethanolamine
N-isoamyl-diethanolamine
N-hexyl-diethanolamine
N-octyl-diethanolamine
N-decyl-diethanolamine
N-cyclopentyl-diethanolamine
N-cyclohexyl-diethanolamine
N-phenyl-diethanolamine
N-o-tolyl-diethanolamine
N-m-xylyl-diethanolamine
N-benzyl-diethanolamine
N-methyl-N-(2-hydroxyethyl)-2-hydroxypropyl amine
N-ethyl-N-(2-hydroxyethyl)-2-hydroxypropyl amine
N-phenl-N-(2-hydroxyethyl)-2-hydroxypropyl amine
N-benzyl-N-(2-hydroxyethyl)-2-hydroxypropyl amine
N-methyl-N-(2-hydroxyethyl)-2-hydroxypropyl amine
N-methyl-N-(2-hydroxyethyl)(1-methyl-2-hydroxyethyl)-amine
N-methyl-N-(2-hydroxyethyl)(2-methyl-2-hydroxypropyl)amine
N-methyl-N-(2-hydroxyethyl)(2-ethyl-2-hydroxybutyl)-amine The foregoing compounds are in certain cases readily available on the open market or are readily prepared by reacting the appropriate primary amine with two equivalents of an organic alkylene oxide in accordance with the procedures outlined in United States Patent 2,213,447, the teachings of which are incorporated herein by reference thereto. The primary organic amines useful in preparing such intermediates employed alkylamine such as methylamine, propylamine, isopropylamine, isoamylamine, hexylamine, octylamine, decylamine, etc. aniline, o-tolylamine, benzylamine, and the like may be used. The alkylene oxides which are reacted with these amines include ethylene oxide, 1,2-propylene oxide, isobutylene oxide, 1,2-butylene oxide, 2,3-butylene oxide, and octylene oxide (2-ethyl-3-propyl-trimethylene oxide). For the preparation of the N-substituted dialkanolamines the procedure in accordance with the foregoing art is quite simple. Thus, for example, in order to prepare an alkyl diethanolamine, one would react alkylamine such as methylamine with two equivalents of ethylene oxide. For the case where an aryl amine is used as the starting material and in order to prepare phenyl diethanolamine, one would react aniline with two equivalents of ethylene oxide.

To prepare N-(2-hydroxyethyl)-N-(2-hydroxypropyl)-butyl amine one would react butylamine with one equivalent of ethylene oxide followed by one equivalent of propylene oxide under more alkaline catalysis. Under less alkaline conditions the diprimary alcohol compound would predominate, i.e., N-(2-hydroxyethyl-N-(1-methyl-2-hydroxyethyl)butylamine.

In similar fashion, 1,2-butylene oxide could give N-(1-ethyl-2-hydroxyethyl) or N-2-hydroxybutyl substitutions depending on reaction conditions and 2,3-butylene oxide would give the N-(1-methyl-2-hydroxyethyl propyl) substitution.

Various other examples may be readily deduced, the restrictions being that one alcohol group must be primary and the compound must vaporize. It is believed that the products of diprimary alcohols will occur in higher yields than the products of primary-secondary type compounds. Disecondary alcohols are not appropriate. At least one terminal hydroxyl must be a primary hydroxyl, i.e. $CH_2OH$ since two hydrogens on this carbon are necessary in the subsequent ring closure.

The present invention will be more fully understood from the following illustrative examples:

EXAMPLE I

Preparation of Catalyst

This catalyst was prepared by slurrying together 66.7 grams of basic copper carbonate, 35.6 grams of aqueous sodium silicate (40° Bé.) and 66.7 grams of distilled water and sprayed on a 1 liter of granular (4–8 mesh) pumice with agitation. This was done in an open jar on a rolling mill. (For larger batches a cement mixer might be found more convenient.) This resulted in pumice coated with wet basic copper carbonate and sodium silicate.

This is then dried and reduced in a stream of hydrogen at 210° C. The reduction is usually complete within 24 hours at this temperature if sufficient hydrogen has been used. When reduced, the catalyst is active and ready for the reaction. Spent catalyst may be oxidized with oxygen at elevated temperature (300–400° C.) and reduced as above for reactivation.

Description of Dehydrogenation Equipment

The equipment used consists of components as follows:

Reactor: A 2 inch i.p.s. vertical reactor, 30 inches long containing approximately 1.8 liters of catalyst. This was heated by four electric units each separately controlled. An internal concentric thermowell was used to sense and control the temperature. The entrance was at the top, the exit at the bottom.

Vaporizer: The reactor was preceded by a similar unit which served as the vaporizer. The vaporizer was packed with inert material. The gas entered at the bottom. The liquid entered at the top and percolated downward over the hot packing until vaporized and then was entrained by the gas and carried upward and out of the vaporizer to the reactor. (If no carrier gas was used the vapors would rise and pass out of the vaporizer unassisted.)

The gas was metered out of storage cylinders thru suitable pressure reducing devices using a calibrated rotometer typed evice. The liquid was metered out of a calibrated reservoir with a pump.

The reactor was followed by a condenser, a gas separator, a product reservoir, and suitable gas metering equipment. Various pressure gases, back pressure devices, traps, valves, recorders, etc. completed the essential equipment.

Generation of Catalyst

The foregoing apparatus was charged with 1.8 liters of catalyst prepared as described above, except that it had been allowed to dry, but not previously reduced. This was heated to and maintained at 210° C. in a stream of hydrogen flowing at a rate of 6 moles per hour. After 22 hours the theoretical amount of water had been collected and the catalyst was deemed generated.

Description of Reaction and Product

The equipment containing the generated catalyst was heated to 275° C. Hydrogen was admitted at a rate of 11 moles per hour and N-methyl-diethanolamine was pumped and vaporized at a rate of 126 grams per hour. When the system seemed to have assumed steady state conditions, the product was collected at a rate of 117 grams per hour, 112 being collected at 25° C. and 5 grams in the effluent gas at solid carbon dioxide temperature. The 112 grams analyzed 91.4% according to saponification equivalent determination. This represents a rate of conversion of 84%.

This product was carefully fractionated and found to boil at 111° C. at 10 mm. The refraction index was $n_D^{25}=1.4592$. Elemental analysis was as follows:

|   | Calculated For ![structure] | Found |
|---|---|---|
| C | 52.16 | 52.30, 52.41 |
| H | 7.88 | 8.09, 8.14 |
| N | 12.18 | 12.25 |

Calculated For:
```
     CH3
      |
      N
   /     \
  CH2    CH2
   |      |
  CH2    C=O
     \  /
      O
```

The lactone configuration was noted by absorptions in the infrared.

A picrate was prepared using a very slight excess of the amine and recrystallized from benzene. M.P.=192–194°.

|   | Calculated For $C_{11}H_{12}N_4O_9$ | Found |
|---|---|---|
| C | 38.38 | 38.69 |
| H | 3.51 | 3.58 |
| N | 16.28 | 16.00 |

The 4-methyl-2-morpholone was also reacted with water to form N(2-hydroxyethyl)sarcosine. This zwitterion was detected in the infrared and the elemental analyses were reasonable:

|   | Calculated For $C_5H_{11}NO_3$ | Found |
|---|---|---|
| C | 45.2 | 45.45 |
| H | 8.26 | 8.39 |
| N | 10.53 | 11.02 |

The 4-methyl-2-morpholone was then regenerated by heating to drive off water. All of the above facts prove the structure of the product.

EXAMPLE II

The dehydrogenation of Example I was repeated except that the hydrogen rate was increased to 14.7 gram moles per hour and the feed rate was increased to 234 grams per hour. The apparatus and catalyst had been used previously during parts of three working days under conditions similar to Example I.

The product was collected at 25° at a rate of 218 grams per hour. This was analyzed through measurement of the absorption at 5.74μ in the infrared spectrum and found to contain 99.8% 4-methyl-2-morpholone corresponding to a conversion of 96.2%.

EXAMPLE III

The procedure of Example I was followed except that no hydrogen was introduced. The actual feed and product rates at steady conditions were 236 grams and 219 grams, respectively, the product consisting of 216 grams condensed at 25° and 3 grams condensed in a Dry Ice trap. The product, analyzed by infrared techniques, contained 68% 4-methyl-2-morpholinone. Starting material and N-(2-hydroxyethyl) sarcosine were also present in the product.

This example illustrates the comparatively inferior results obtained when no hydrogen is used, even though the residence time over the catalyst is thereby increased.

EXAMPLE IV

Following Example III, with the same catalyst, feed rate, etc., nitrogen was introduced at a rate of 5.26 moles per hour. The product analysis fell to 11% when steady conditions were established, and 36 minutes later the analysis was 10%.

This example illustrates, especially when taken with the following example, that an inert carrier gas is not beneficial to the reaction, but rather deleterious. The low analysis of the product is attributed to rapid deactivation of the catalyst. The residence time was also reduced compared to Example III. This does not occur when hydrogen is added, even though the residence time is reduced compared to the above two examples, i.e. III and IV.

EXAMPLE V

Following Example IV, using the same old catalyst, etc., the use of hydrogen was restored as in Example II. The first sample analyzed 8% 4-methyl-2-morpholinone, the second, 52 minutes later, was 9.3%. After 5 hours from the first sample the analysis was 12.1, after 6 hours 14.3, after 18½ hours, 27.1% at which time the trend seemed apparent and the experiment was discontinued.

This example illustrates that hydrogen not only has the power to maintain catalyst activity (as in Example I) but has also the power to reactivate a deactivated catalyst. This example demonstrates not only the necessity for having the hydrogen present, but also the specificity of the hydrogen.

EXAMPLE VI

The process of Example I was repeated with the exception that N-methyl diethanolamine was replaced by N-phenyl diethanolamine and the temperature was raised from 275 to 300° C. The product was 4-phenyl-2-morpholone.

EXAMPLE VII

The process of Example I was repeated with the exception that N-methyl diethanolamine was replaced by N-ethyl-diethanolamine to yield 4-ethyl-2-morpholone as the product.

EXAMPLE VIII

The process of Example I was repeated with the exception that N-methyl diethanolamine was replaced by N-(2-hydroxyethyl)-N-(2-hydroxypropyl)-propylamine and the temperature was raised from 275 to 300° C. The product was 4-propyl-6-methyl-2-morpholone.

From the foregoing examples it is clearly evident that the process of the present invention utilizes a unique starting material, N-substituted-dialkanolamines in the vapor phase over a dehydrogenation catalyst at a temperature ranging from 250 to 420° C. at moderate pressures, with added hydrogen gas.

All of the 4-substituted-2-morpholones prepared in accordance with the process of the present invention are useful as intermediates in the preparation of pharmaceuticals, surfactants, etc. The morpholones readily hydrolyze to the trifunctional N-(hydroxyalkyl)-sarcosines. The water solubility of the copper salts of the sarcosines is indicative of applications related to trace elements.

We claim:
1. The process of preparing a morpholone of the formula:

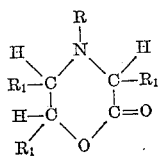

where R represents a member selected from the class consisting of alkyl of from 1 to 10 carbon atoms, phenyl, tolyl, xylyl and benzyl, and $R_1$ represents a member selected from the class consisting of hydrogen and alkyl of from 1 to 2 carbon atoms which comprises vaporizing 1 to 2 moles of a compound of the formula:

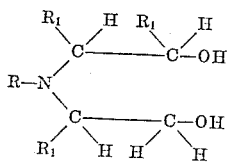

wherein R and R$_1$ have the same values as above, in the presence of hydrogen passing the vapors of said compound over a dehydrogenation catalyst heated at a temperature of 200 to 420° C., adding hydrogen in the ratio of 5 to 100 moles to 1 mole of said vaporized compound followed by condensation and collection of the morpholone.

2. The process according to claim 1 wherein the compound vaporized is N-methyl diethanolamine.

3. The process according to claim 1 wherein the compound vaporized is N-phenyl diethanolamine.

4. The process according to claim 1 wherein the compound vaporized is N-benzyl diethanolamine.

5. The process according to claim 1 wherein the compound vaporized is N-(2-hydroxyethyl)-N-(2-hydroxy-n-butyl)-decylamine.

6. The process according to claim 1 wherein the compound vaporized is N-ethyl diethanolamine.

7. The process according to claim 1 wherein the compound vaporized is 2[N-methyl-N-(2-hydroxyethyl)-amino]-propanol-1.

References Cited in the file of this patent

UNITED STATES PATENTS 2,777,846     Laemmle _____ Jan. 15, 1957

FOREIGN PATENTS 727,482     Great Britain _____ Apr. 6, 1955
578,968     Canada _____ July 7, 1959